US008473666B2

(12) United States Patent
Cohen et al.

(10) Patent No.: US 8,473,666 B2
(45) Date of Patent: Jun. 25, 2013

(54) SYSTEMS AND METHODS FOR DRIVERLESS OPERATION OF USB DEVICE

(75) Inventors: Daniel C. Cohen, Newtonville, MA (US); Noah L. Pendleton, Woburn, MA (US); Maarten Janson, Turloughmore (IE); James S. Spitaels, Shrewsbury, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 119 days.

(21) Appl. No.: 13/169,709

(22) Filed: Jun. 27, 2011

(65) Prior Publication Data
US 2012/0331202 A1 Dec. 27, 2012

(51) Int. Cl.
*G06F 13/20* (2006.01)
*G06F 3/00* (2006.01)

(52) U.S. Cl.
USPC .................................. 710/313; 710/8; 710/36

(58) Field of Classification Search
USPC ............... 710/5–10, 15–19, 36–38, 305–313; 719/321–322; 700/94
See application file for complete search history.

(56) References Cited

U.S. PATENT DOCUMENTS

| 5,280,585 | A | 1/1994 | Kochis et al. | |
|---|---|---|---|---|
| 5,991,546 | A | 11/1999 | Chan et al. | |
| 6,389,495 | B1 * | 5/2002 | Larky et al. | 710/8 |
| 6,493,770 | B1 * | 12/2002 | Sartore et al. | 710/8 |
| 6,754,725 | B1 * | 6/2004 | Wright et al. | 710/8 |
| 6,813,650 | B1 * | 11/2004 | Cato et al. | 710/14 |
| 7,562,360 | B2 * | 7/2009 | Tai et al. | 717/178 |
| 7,574,534 | B2 * | 8/2009 | Bolan et al. | 710/15 |
| 7,804,401 | B2 | 9/2010 | Kim et al. | |
| 2005/0033546 | A1 * | 2/2005 | Hamaguchi et al. | 702/141 |
| 2008/0005370 | A1 * | 1/2008 | Bolan et al. | 710/8 |
| 2008/0005409 | A1 * | 1/2008 | Kolokowsky et al. | 710/62 |
| 2008/0276012 | A1 * | 11/2008 | Mesa et al. | 710/13 |
| 2009/0187687 | A1 | 7/2009 | Hulbert et al. | |
| 2009/0251413 | A1 | 10/2009 | Winchester | |
| 2010/0146279 | A1 | 6/2010 | Lu et al. | |

OTHER PUBLICATIONS

"Universal Serial Bus (USB) HID Usage Tables". Version 1.12, pp. 1-168. Oct. 28, 2004.
"USB HID Host and Device: Overview" http://www.usb-software.org/usb_hid_host_and_device.php. 2009.
IDTECH® Value Through Innovation. "User Manual: VersaKey with USB-HID Reader Interface". 2006.
International Search Report and Written Opinion of the International Searching Authority from corresponding PCT/US2012/043754 mailed Sep. 13, 2012.
STMicroelectronics AN1633 Application Note. "Device Firmware Upgrade (DFU) Implementation in Non-USB Applications". Microcontroller Division Applications. pp. 1-9. 2003.
USB.org-HID Tools. "HID Information". http://www.usb.org/developers/hidpage/. 2010.

* cited by examiner

*Primary Examiner* — Christopher Shin
(74) *Attorney, Agent, or Firm* — Lando & Anastasi, LLP

(57) ABSTRACT

Systems and methods of re-enumerating peripheral devices operatively connected to a computer system are provided. In one example, a system is configured to disable an existing connection between an operating system and a peripheral device established through a device driver by re-describing the peripheral device to the OS. In another example, the system can be further configured to execute operation(s) on the peripheral device without new driver installation using communication channels native to the OS. Once the operation (s) are complete, the system can be configured to restore the existing connection.

20 Claims, 6 Drawing Sheets

SYSTEMS AND METHODS FOR DRIVERLESS OPERATION OF USB DEVICE

BACKGROUND

1. Technical Field

The technical field relates generally to systems and methods for controlling device operation and, more particularly, to systems and methods for controlling execution of driverless operations on attached peripheral devices.

2. Background

Conventional device installation on a computer system typically involves configuration of the Operating System ("OS") executing on the computer system to accept and manage peripheral devices. Peripheral devices (also referred to as "devices") include any hardware based device attached to the computer system that was not part of its original configuration. In conventional OS's, the OS is configured to automatically detect these devices and load appropriate device drivers based on a device type and any available device description. Automatic detection and loading of device drivers can assist users in integrating and operating standard devices (e.g., a mouse, a keyboard, an external hard drive, a printer, etc.). However, conventional device driver operation is known to have significant flaws, including undesired operation, OS instability and even OS failure due to driver errors.

Standardizing the communication and operations of device drivers has attempted to resolve some of these issues. For peripheral devices connected through a USB connection, a Human Interface Device ("HID") architecture can apply. Any device can be a USB HID class device as long it is configured to meet the USB HID class logical specifications. The HID specification defines standard configurations and communication channels employed. As part of the standard communication protocol, the HID specification defines control endpoints and interrupt endpoints for communicating with USB devices among other communication channels. Within the HID architecture certain types of devices can be organized into specific classes. For example, an uninterruptible power supply device ("UPS") can be grouped into a Power Device Class, and a compliant UPS configured with USB connectivity can also be referred to as a HID Power Device.

When any USB compliant device is connected to a host computer system through a USB connection the device establishes communication with the host computer system. The OS executing on the host computer system identifies the device based on description information provided by the device, which can include identification of a specific class and can include a specific type. Based on the identifying information retrieved by the OS, the OS identifies an appropriate driver and loads the driver to manage the device. In some examples, the OS does not have a driver specific to the device and an end user must first install a vendor supplied device driver to manage the device. Conventional OS's are typically distributed with a multitude of custom drivers supplied by vendors/manufacturers of peripheral devices.

In addition, custom device drivers can be installed through software accompanying a given peripheral device. In some cases, the OS can locate appropriate drivers through a network connection, e.g., the Internet. The OS installs the identified driver and can load the driver to manage the device. In other cases, device drivers are provided on installation media provided with a peripheral device.

USB connected devices communicate through multiple types of sub-communication channels defined by the USB specification. For USB and USB HID compliant device communication can occur using Control Endpoints (Get/Set Feature) for bi-directional communication and Interrupt Endpoints for asynchronous communication initiated by the device or the host OS. Conventionally, an OS only allows one software application (e.g. the installed and loaded driver) to communicate to a peripheral device using the interrupt endpoints. Conventionally, if interrupt control or communication is required by another application or tool, or if additional feature support is required, a new driver must be installed and loaded by the OS to replace the existing driver.

SUMMARY

According to some aspects, requiring new driver installation for transitioning interrupt control, changing peripheral device configuration, or extending the functionality of peripheral devices is undesirable. The need for a new driver typically occurs when vendors update software, revise device operation, support custom features and operations, and/or architect new device drivers specific to a particular device. Typically, most end users are unfamiliar with installing a driver and for the users who have some familiarity, the prospect of installing new device drivers can be intimidating, time consuming, and fraught with error. In addition, installation of new drivers can result in system instability and unintended operation whether due to error, unexpected interaction, or unanticipated function of a driver installed on a given operating system. Further complicating driver issues, driver development may require verification by an OS manufacturer in order to guarantee the driver's validity.

In some embodiments, the difficulties associated with device driver installation are eliminated through execution of "driverless" device control. Driverless device control is available where the OS is capable of communicating and managing a peripheral device without installation of a device driver. For example, the WINDOWS operating systems include standard USB HID drivers usable without installation. As no new driver installation is needed to establish control over the reversion to OS native control, the operation is referred to as driverless. In some examples, user mode applications can communicate with peripheral devices over such driverless communication channels provided by OS native drivers irrespective of any vendor supplied driver being employed to operate the device.

According to another aspect, methods and systems for altering peripheral devices or altering peripheral device control are presented that allow a software application to control interrupt traffic without altering a given OS configuration and/or any installed vendor supplied driver. In some settings, execution of the controlling application can occur without need of any driver installation or further integration with the OS. In some embodiments, driverless control applications can communicate directly with peripheral devices using USB communication channels already configured in the OS. In some settings, the control application can trigger a change in the peripheral device's identification information that breaks existing connections between the OS and installed drivers. In one example, the device is redefined as a generic USB HID device. For example, an external hard drive peripheral device can be redefined as a different device having a different type. Once the external hard drive is re-enumerated as a different device having a different type, any existing connection between the OS and the device using the current driver is broken. Re-enumeration can involve identifying the peripheral device as an unknown type and/or class. In some examples, re-enumeration can include describing the device as a generic type and/or class. Because there exists defined communication channels for USB, communication to the device can still occur without installation of a new driver, establishing "driverless" communication. Thus, based on the selection of identifying information, existing controls already configured in the OS can be employed by the control application to assume management of the peripheral device and any interrupt traffic it generates without new driver installation.

USB connected devices communicate over known USB communication channels the OS can manage these standard communication channels without resort to new driver installation for control. Further, the HID specification serves as an extension of the USB standard including the well-defined communication channels and further defining communication protocols for a variety of HID device classes. The standard OS drivers already available provide the stability and the functionality required to manipulate peripheral devices. The USB standard and associated specifications are believed to be well-known, and the USB standards can be found at world wide web address usb.org, and HID specifications can also be found at the same site usb.org/developers/hidpage/ and include, for example, "Universal Serial Bus Usage Tables for HID Power Devices" at usb.org/developers/devclass_docs/pdcv10.

In some embodiments, driverless control software can communicate to the peripheral device causing the device to be re-enumerated. The re-enumeration process is configured to break any existing connection between the OS and an installed driver. Based on the re-enumeration of the peripheral device, the OS establishes control over the peripheral device using drivers already resident in the OS. Re-enumeration of an HID compliant device breaks existing connections between the device and the OS established through any installed device driver and transitions control to standard USB HID drivers existing on the OS. Once the existing connections are broken, the driverless control software can control the peripheral device using the native USB HID driver and perform any operation desired without resorting to a new driver installation. The supported functions can include operations on the peripheral device that were not supported in the original driver.

In some settings, the driverless control software is configured for individual operations, for example, firmware updates can be executed on a peripheral device. In other settings, multiple operations can be executed on the peripheral device, including, for example, class redefinition, retooling functionality of the device, activation of features of a peripheral device, deactivation of features of a peripheral device, etc. Once the driverless control software executes a desired function on the peripheral device, the driverless control software can be configured to re-establish the identifying information for the device prior to re-enumeration. The OS can be configured to recognize the device under its former definition, and once identified the OS can be further configured to re-establish connection between the OS and the installed driver used prior to re-enumeration of the peripheral device.

According to one aspect, provided is a system comprising at least one processor operatively connected to a memory, wherein the processor is configured to execute system components from the memory, a control component configured to disable an existing connection between an operating system and at least one peripheral device, wherein the existing connection is established through a first device driver, establish communication with the at least one peripheral device using defined communication channels while the existing connection is disabled, execute at least one operation on the at least one peripheral device over the defined communication channels, and trigger enumeration of the at least one peripheral device to restore the existing connection between operating system and the at least one peripheral device. According to one embodiment, the control component is further configured to redefine the peripheral device's identifying information over the existing connection. According to one embodiment, the control component is further configured to restore the peripheral device's identifying information to an original state. According to one embodiment, the control component is further configured to trigger a hardware discovery operation executed by the operating system. According to one embodiment, the at least one peripheral device is operatively connected to the computer system through a USB interface.

According to one embodiment, the control component is further configured to determine that the at least one peripheral device supports re-enumeration. According to one embodiment, the control component is further configured to determine the peripheral device is identified as a USB Human Interface Device (HID). According to one embodiment, the control component is further configured to render the peripheral device unknown to the operating system. According to one embodiment, the control component is further configured to communicate with the peripheral device using driverless communication channels. According to one embodiment, the system is configured to establish communication with the at least one peripheral device using defined communication channels while the existing connection is disabled using a native OS driver. According to one embodiment, the native OS driver is a USB HID driver. According to one embodiment, the defined communication channels include control and interrupt endpoints for the at least one peripheral device.

According to one embodiment, the at least one operation includes at least one of updating firmware of the peripheral device, enabling additional functionality on the peripheral device, disabling functionality on the peripheral device, and modifying at least one operating parameter of the peripheral device. According to one embodiment, the peripheral device comprises an uninterruptable power supply ("UPS") device. According to one embodiment, the UPS device is identified as a USB HID Power device. According to one embodiment, the driverless communication occurs over at least one of control and interrupt endpoints associated with the at least one peripheral device. According to one embodiment, the at least one operation changes at least one operating parameter of the peripheral device.

According to one aspect, provided is a computer implemented method for re-enumerating a peripheral device. The method comprises disabling, by a computer system, an existing connection between an operating system executing on the computer system and at least one peripheral device operatively connected to the computer system, wherein the existing connection is established through a first device driver, establishing, by the computer system, communication with the at least one peripheral device using defined communication channels, executing, by the computer system, at least one operation on the at least one peripheral device over the defined communication channels, and triggering, by the computer system, enumeration of the peripheral device to restore the existing connection between the operation system and the peripheral device established through the first device driver. According to one embodiment, the act of disabling the existing connection includes an act of redefining the peripheral device's identifying information over the existing connection. According to one embodiment, the method further comprises an act of restoring the peripheral device's identifying information to an original state. According to one embodiment, the act of triggering enumeration of the peripheral device to restore the existing connection includes an act of triggering a hardware discovery operation executed by the operating system. According to one embodiment, the at least one peripheral device is operatively connected to the computer system through a USB interface. According to one embodiment, the method further comprises determining that the at least one peripheral device supports re-enumeration. According to one embodiment, the method further comprises determining the peripheral device is identified as a USB Human Interface Device (HID). According to one embodiment, the act of disabling the existing connection includes an act of rendering the peripheral device unknown to the operating system. According to one embodiment, the act of establishing communication includes communicating with the peripheral device using driverless communication channels. According to one embodiment, the act of establishing communication includes occurs using a native OS driver. According to one embodiment, the native OS driver is a USB HID driver. According to one embodiment, the defined communication channels include control and interrupt endpoints for the at least one peripheral device. According to one embodiment, the at least one operation includes at least one of updating firmware of the peripheral device, enabling additional functionality on the peripheral device, disabling functionality on the peripheral device, and modifying at least one operating parameter of the peripheral device. According to one embodiment, the peripheral device comprises an uninterruptable power supply ("UPS") device. According to one embodiment, the UPS device is identified by the operating system as a USB HID power class device. According to one embodiment, the driverless communication occurs over at least one of control and interrupt endpoints associated with the at least one peripheral device. According to one embodiment, the at least one operation changes at least one operating parameter of the peripheral device. According to one embodiment, the act of disabling the existing connection includes an act of disabling the first device driver.

According to one aspect provided is a non-transitory computer readable medium. The computer readable medium has sequences of instructions stored thereon for re-enumerating a peripheral device, the sequences of instruction including instructions that will cause at least one processor to disable an existing connection between an operating system executing on the computer system and at least one peripheral device operatively connected to the computer system, wherein the existing connection is established through a first device driver, establish communication with the at least one peripheral device using defined communication channels, execute at least one operation on the at least one peripheral device over the defined communication channels, and trigger enumeration of the peripheral device to restore the existing connection between the operation system and the peripheral device established through the first device driver.

According to one embodiment, the sequences of instruction include further instructions that will cause the at least one processor to redefine the peripheral device's identifying information over the existing connection. According to one embodiment, the sequences of instruction include further instructions that will cause the at least one processor to restore the peripheral device's identifying information to an original state. According to one embodiment, the sequences of instruction include further instructions that will cause the at least one processor to trigger a hardware discovery operation executed by the operating system. According to one embodiment, the at least one peripheral device is operatively connected to the computer system through a USB interface.

According to one embodiment, the sequences of instruction include further instructions that will cause the at least one processor to determine that the at least one peripheral device supports re-enumeration. According to one embodiment, the sequences of instruction include further instructions that will cause the at least one processor to determine the peripheral device is identified as a USB Human Interface Device (HID). According to one embodiment, the sequences of instruction include further instructions that will cause the at least one processor to render the peripheral device unknown to the operating system.

According to one embodiment, the sequences of instruction include further instructions that will cause the at least one processor to communicate with the peripheral device using driverless communication channels. According to one embodiment, the sequences of instruction include further instructions that will cause the at least one processor to establish communication with the at least one peripheral device using defined communication channels while the existing connection is disabled using a native OS driver. According to one embodiment, the native OS driver is a USB HID driver. According to one embodiment, the defined communication channels include control and interrupt endpoints for the at least one peripheral device. According to one embodiment, the at least one operation includes at least one of updating firmware of the peripheral device, enabling additional functionality on the peripheral device, disabling functionality on the peripheral device, adding features to the peripheral device, and modifying at least one operating parameter of the peripheral device.

According to one embodiment, the peripheral device comprises an uninterruptable power supply ("UPS") device. According to one embodiment, the UPS device is identified as a USB HID power device. According to one embodiment, the driverless communication occurs over at least one of control and interrupt endpoints associated with the at least one peripheral device. According to one embodiment, the at least one operation changes at least one operating parameter of the peripheral device.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example or embodiment disclosed herein may be combined with any other example or embodiment. References to "an example," "an embodiment," "some examples," "some embodiments," "an alternate example," "various embodiments," "one example," "at least one embodiment," "this and other examples" or the like are not necessarily mutually exclusive and are intended to indicate that a particular feature, structure, or characteristic described in connection with the example or embodiment may be included in at least one example or embodiment. The appearances of such terms herein are not necessarily all referring to the same example or embodiment. Furthermore, in the event of inconsistent usages of terms between this document and documents incorporated herein by reference, the term usage in the incorporated references is supplementary to that of this document; for irreconcilable inconsistencies, the term usage in this document controls.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Aspects and embodiments disclosed herein provide processes and apparatus by which driverless operations can be executed on peripheral devices operatively connected to a computer system. For instance, at least one embodiment implements a re-enumeration process to break existing connections between an OS executing on the computer system and a loaded device driver for controlling the peripheral device. In some embodiments, the device driver is supplied by the vendor of the device to work specifically with a given device. Once the connection between the OS and the driver is broken native management can be invoked by "driverless" control applications. Driverless refers to the capability of the control applications to manage the peripheral devices using embedded drivers in the OS without requiring the installation of new device drivers that conventional approaches may require.

According to another aspect, driverless control engines executed by a processor operatively connected to a memory are provided. The driverless control engines are configured for installation and execution on any conventional OS. A driverless control engine can be further configured to identify peripheral devices capable of driverless operation, including for example, the engine can identify HID compliant USB devices. The control engine can be configured to break existing connections between an OS and a peripheral device established through an installed driver. In one example, the control engine triggers a re-enumeration of the peripheral device, by triggering a usage available on a USB HID device. The usage is configured to trigger re-identification of the USB HID device as a device of a different type than previously configured. When the specific usage is written to the peripheral device via control endpoints, the peripheral device alters its descriptor information, re-identifying itself to the OS and breaking an existing connection between the device and the OS.

Figure 1:
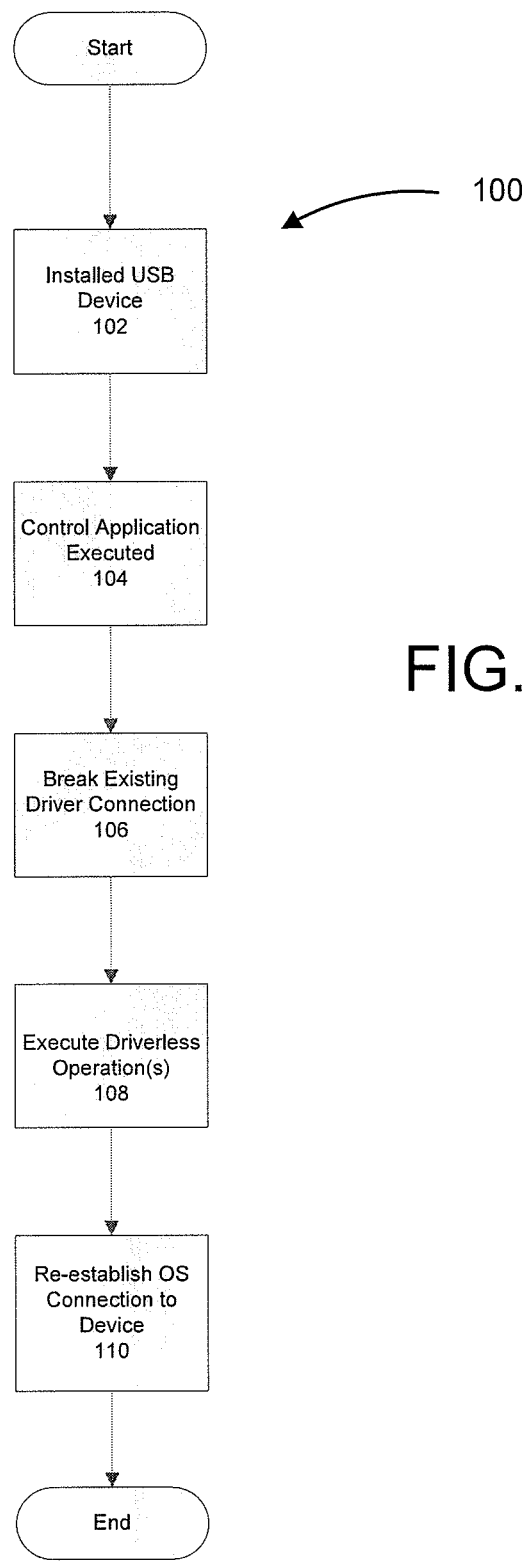
FIG. 1 is a flow diagram depicting an example process for executing driverless operations on an installed peripheral device.

FIG. 1 illustrates an example process flow 100 for executing driverless operations on a peripheral device. Processes and apparatus for performing driverless operations are particularly suited to environments where communication between a computer system and a peripheral device occurs using well defined protocols and standards, for example, USB and USB HID. In some embodiments, peripheral devices are USB HID compliant devices and employ the well-defined communication channels described in the USB and the HID specifications for communication between a host (connected computer system) and a device.

Process 100 begins at 102 with the coupling of a peripheral device to a computer system. In some embodiments, the peripheral device can be connected to the computer system via a USB interface. In some settings, the peripheral device can be USB HID compliant. For example, a UPS complying with the USB HID Power Class Device specification can be the installed peripheral device at 102. At 104, a control application is executed on the computer to perform "driverless" operations on the peripheral device. The driverless operations refer to the ability to assume control of interrupt communication with the peripheral device without requiring installation of a new device driver. According to some embodiments, this is accomplished at 106, by breaking any connection between the OS and a driver managing the peripheral device. The connection can be broken by re-enumerating the peripheral device as a type and/or class unknown to the OS. In some examples, the driver managing the peripheral device is a vendor supplied device driver specific to the peripheral device. In another example, descriptor information is altered from vendor specific information to identify the device as a generic type and/or class of device. In other embodiments, the existing connection can be established through an OS native driver.

Conventional OS's upon connection to a peripheral device attempt to identify the peripheral device using descriptors stored on the peripheral device and select an appropriate driver to manage the peripheral device. Identification of the peripheral device and selection of a driver is referred to as enumeration. The enumeration process can include a host (connected computer system) discovering a newly connected peripheral device by reading its descriptors, identifying the peripheral device, and loading an appropriate device driver. A USB peripheral device that has been enumerated at act 102, can then be re-enumerated at act 106 to break the existing connection between the OS and the peripheral device made through the selected driver. In one example, breaking the existing connection occurs by rewriting the descriptors for the peripheral device and triggering re-enumeration under the rewritten descriptor information. Once the existing connection is broken, the control application can use any of the defined communication channels for the peripheral device including interrupt control.

Once the control application can communicate using any of the defined communication channels, the control application performs operations on the peripheral device at act 108. The operations can change operating parameters of the peripheral device, change function, update and/or replace resident code, and can access device functionality not supported by the existing connection between the OS and the peripheral device. For example, firmware updates on peripheral devices having vendor supplied device drivers typically require installation of a new device driver also supplied by the vendor. The new device driver replaces the existing driver. In some instances, the new driver is configured specifically for the purpose of updating the device firmware. The requirement of installing a new device driver can be eliminated by breaking the connection between the OS and the existing driver at 106 and allowing the control application to employ defined communication channels to execute desired operations on the peripheral device at 108 without any new driver installation. Once a desired operation is complete, the connection between the OS and the peripheral device is restored by again enumerating the peripheral device under its original description at act 110. The OS will recognize the device under its original description and the appropriate driver will already be installed and used to manage the peripheral device, for example at 110. Is some examples, the OS identifies the peripheral device under its original description in response to disconnecting and reconnecting a physical connection, e.g., a USB cable, between the computer system and the peripheral device. In some examples, the control software can trigger a hardware discovery operation native to the OS once the peripheral device is identified under its original description. The OS is configured to recognize the peripheral device under its original description and employ the already installed device driver to manage the peripheral device.

In another example, the OS can identify a native OS driver for operating the peripheral device at act 102. The existing connection between the OS and the native OS driver can be broken by a control application executed at act 104 to transition control of the control and interrupt endpoints of the peripheral device from the existing connection to the control application or another application. In some examples, transition of control occurs by breaking the existing connection through re-enumeration of the peripheral device at act 106. In some embodiments, the control application can access additional features on the peripheral device that were not supported by the existing connection, for example at act 108. Further, the control application can be configured to update firmware of the peripheral device, enable additional functionality on the peripheral device, disable functionality on the peripheral device, add features to the peripheral device, access features not supported by the existing connection, and modify least one operating parameter of the peripheral device. According to some embodiments, once the control application has performed a configured operation(s), control of the control and interrupt endpoints can be returned to the existing connection. In some examples, the control application can trigger the peripheral device to re-identify itself under its original information at act 110. The OS is configured to recognize the peripheral device and re-established the existing connection using the native OS driver. It other examples, the control application can trigger the peripheral device to adopt new identifying information, triggering the OS to use a different driver to establish a connection between the OS and the peripheral device.

Figure 2:
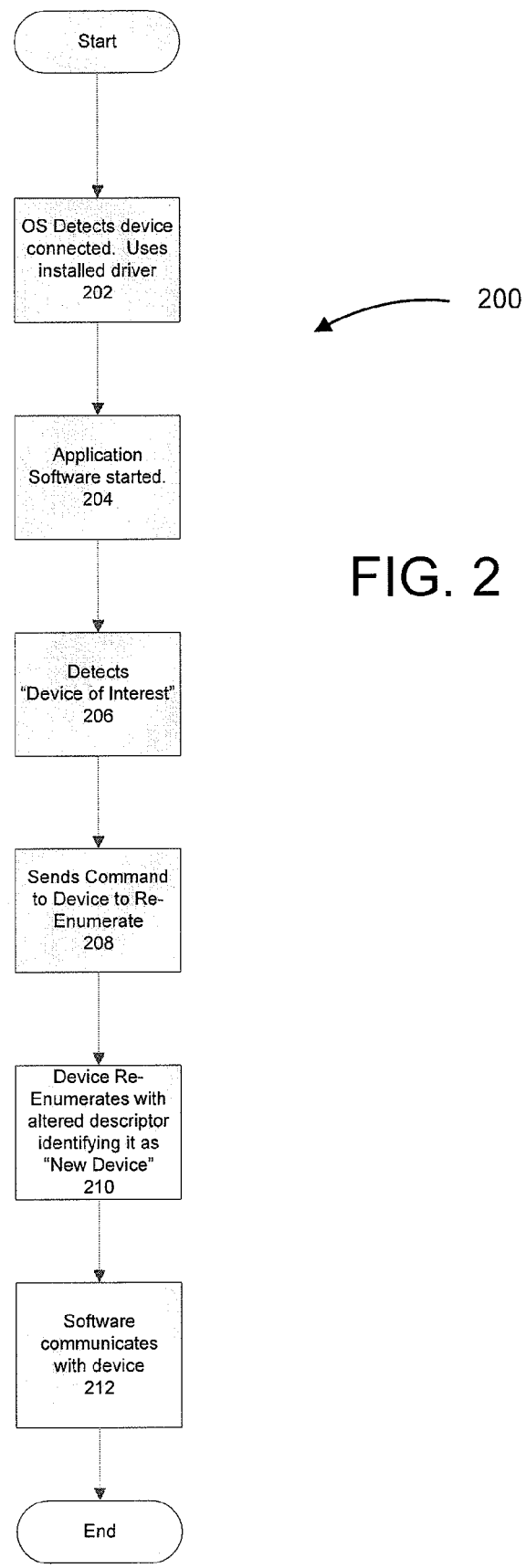
FIG. 2 is a flow diagram depicting an example process for executing driverless operations on an installed peripheral device.

FIG. 2 is an example process 200 for transitioning control of a peripheral device from an installed driver to another application. Process 200 is implemented on a computer system connected to a USB HID compliant peripheral device. At act 202 the operating system resident on the computer system detects the connected peripheral device and uses an installed driver to establish a connection to the peripheral device at act 202. A control application is executed at act 204, which is configured to reallocate control of the peripheral device from the OS and the currently installed driver to the control application. At act 206, a peripheral device of interest is detected. The peripheral device of interest is determined based on requirements for performing an operation on the peripheral device. In some settings, new firmware for a peripheral device may have become available and an end user wishes to upgrade the peripheral device to the latest revision of firmware. Automatic update processing associated with the peripheral device can also identify devices of interest. Conventionally, device vendors include executables configured to periodically check for updates to the peripheral device published by the vendor. Typically an end user or a peripheral device vendor (including the manufacturer) will be aware of devices on which operations (e.g., updates, revisions, etc.) are desired.

The desired operation can vary based on the peripheral device, the user, and other environmental factors. In some settings, operations beyond firmware updates can be executed which can include, for example, extending functionality of a peripheral device, eliminating functionality of a peripheral device, managing and/or modifying executable information on the peripheral device, managing and/or modifying non-executable information on the peripheral device, accessing features not supported by the current driver, among other options. The desired operation can also minor any native operating system operation executed on the computer system and provide the same functionality.

Once a peripheral device of interest is detected at act 206, the peripheral device may optionally be tested to determine if the device is capable of re-enumeration. In some examples, a re-enumeration usage can be defined on the peripheral device. The optional testing step can be used to determine if a re-enumeration usage is defined on the given peripheral device. According to the USB HID a "usage" identifies supported operations on the peripheral device. A usage can describe a collection configured to implement the operation. The collection can include each Input, Output, Feature, and/or Collection data item used, and together each can be assigned a purpose with its own usage. Standard usages and usage tables are available for USB HID devices as part of the USB HID standard incorporated herein.

A re-numeration usage can be stored on the peripheral device. In some embodiments, a request to write the usage to a specific value triggers the device to re-describe itself to the OS. In some embodiments, the trigger can be executed a multitude of other ways including responsive to a push button or other user interface which can be configured on the attached computer system or in some examples directly on the peripheral device. In some embodiments, the re-enumeration usage alters the descriptors for the device once triggered. In further embodiments, the re-enumeration usage can be triggered automatically, by an executing process, and in some alternatives through an interface. The interface can be displayed on a host computer or can be accessed on the peripheral device itself. In one example, the alterations can be temporary and restored upon a new physical connection to a computer system. In another example, the alterations can be stored and return of the peripheral device to its original descriptors can require another alteration of the peripheral device's descriptors. In some embodiments, determining if the device is capable of re-enumeration can include verification of the presence of the re-enumeration usage.

In some instances, the optional testing may determine that the peripheral device is USB HID compliant. For devices that do not have a re-enumeration usage but are USB HID compliant, a new usage can be installed using conventional techniques. In particular, a new driver can be configured that allows a USB HID compliant device to be updated with a re-enumeration usage. The new driver would replace any existing driver installed on a computer system, update the USB HID compliant device to include a re-enumeration usage, and for example, process 200 could proceed for such devices as described herein.

At act 208, the control application sends a command to the peripheral device to re-enumerate. In some embodiments, act 208 can include a request from the control application delivered to the device for triggering operations associated with the re-enumeration usage. Once the peripheral device receives the request, the peripheral device alters its descriptors. The altered descriptor information is provided to the OS causing re-enumeration of the peripheral device using the altered descriptor information at 210. In other embodiments, defined communication channels between the computer system and the device, including for example control endpoints, can be used to alter the descriptors for the peripheral device directly. Once descriptor information is altered, the OS is configured to trigger re-enumeration of the device under the altered descriptor information at 210. The re-enumeration process can be configured to change the peripheral device from one recognized by the OS to a "new" device. In one example, the new device descriptors can be set to be unknown to the OS, or the classification for the device can be changed to another known class of device. In some examples, the device alters its descriptor records to indicate the device is a generic class and/or type of device. In one example, the altered descriptor records can describe a generic USB HID device.

Once re-enumeration occurs at act 210, the existing connection between the OS and the peripheral device is broken and the control application can communicate with the peripheral device without resort to the installed driver over defined communication channels at act 212. The defined communication channels are defined natively to the OS and are available without installation of a new and/or a vendor supplied driver. Once control of the peripheral device is transitioned to the control application process 200 ends. Other processes can be implemented and executed to perform operations on the peripheral device without resort to driver installation. In some settings, the control application can include such other processes, and in others, can trigger the other processes upon completion of process 200.

In some instances, particular peripheral devices are suited for driverless operations that allow software executing on a computer system to take control of the peripheral device from an installed driver supplied by the device vendor and return control to the installed driver once the software completes a defined operation or operations. Controlling the peripheral device includes directing interrupt traffic to the executing software. As conventional OS's typically only allow one application to manage the interrupt traffic, the driver installed specifically for the peripheral device must release control of the interrupt traffic. This property of conventional OS's results in inefficiencies when managing peripheral devices, and in particular, when managing UPS and smart UPS devices. In some embodiments, UPS and smart UPS devices may require redefinition of their device type in order to accomplish maintenance functions on the UPS devices. Conventional approaches would require new device drivers to be installed and the replacement of any existing drivers in order to perform these operations. New driver installations can subject such systems to instability, unanticipated function triggered by the OS, among other issues. In some examples, user error, confusion, and reluctance further compound issues associated with new driver installation. According to some embodiments, system efficiency and stability is improved by eliminating the need for new driver installation.

Figure 3:
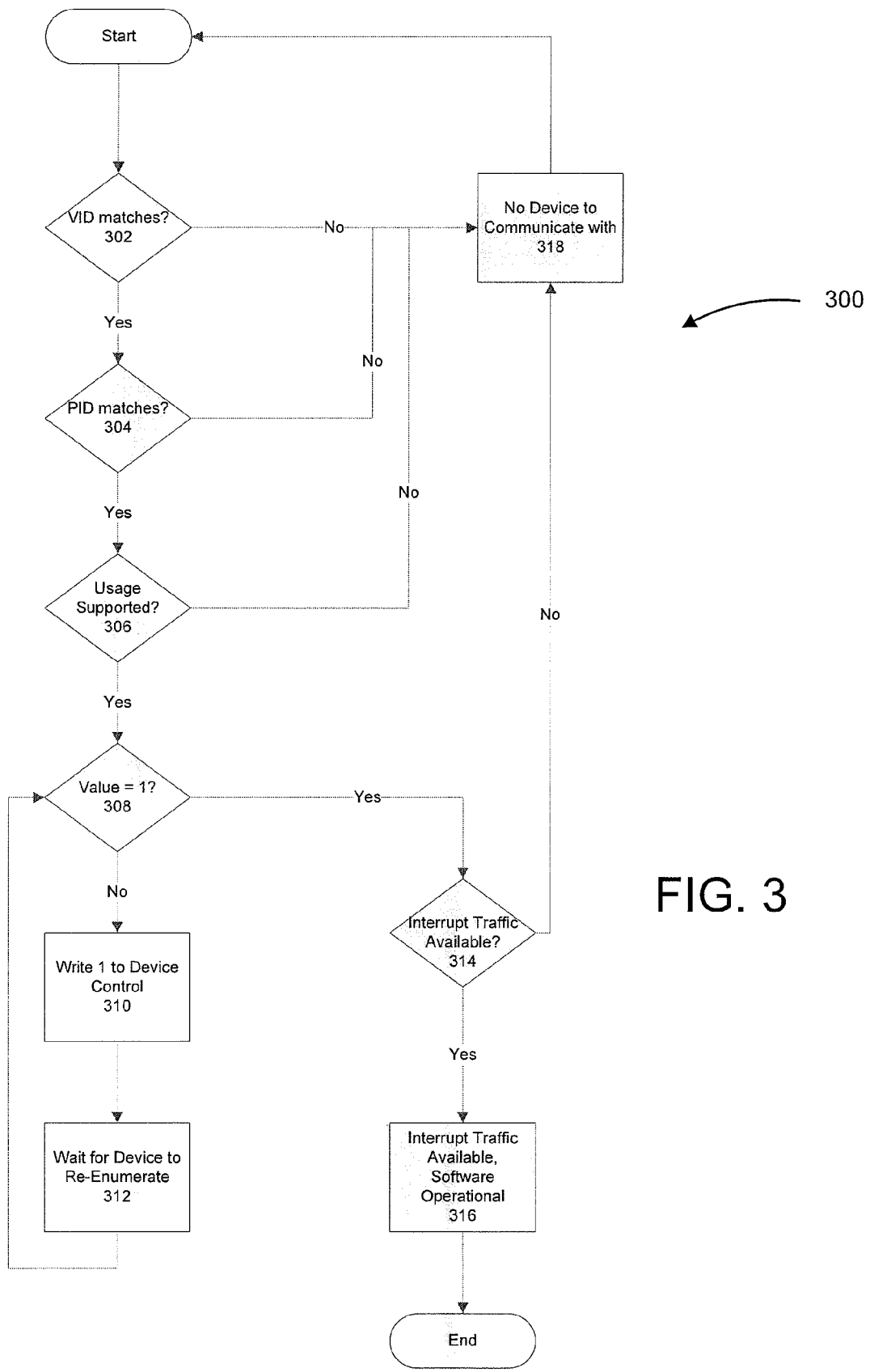
FIG. 3 is a flow diagram depicting an example process for executing driverless operations on an installed peripheral device.

FIG. 3 illustrates an example process 300 for identifying vendor specific peripheral devices connected to a computer system which are configured for driverless operation. The reference to a vendor is also intended to include a peripheral device manufacturer. Typically, the vendor and the manufacturer are the same entity. In some examples, process 300 can be used to specifically identify UPS devices by vendor and product ID. In other embodiments, other peripheral devices are identified by their vendor and product ID. Identification can require matching of a specific vendor, a specific product ID, and whether re-enumeration of the device is supported. Identification can also include determination of USB HID compliance, identifying a device that could support re-enumeration even if a particular re-enumeration usage is not yet defined on the device.

In some embodiments, operations to be performed on the peripheral device are specific to not only the peripheral device but a specific manufacturer and a specific product provided by the manufacturer. Firmware updates, for example, are typically specific to vendor and product. Firmware updates can even be specific to firmware revisions on the given peripheral device. Other operation for execution on a peripheral device, likewise could be inappropriate across vendors and/or product lines.

Process 300 beings with testing whether information associated with one or more peripheral devices matches a defined vendor identifier at act 302. At 302 (NO), no peripheral device with a matching vendor identifier is detected and the process determines no device is available at act 318, either ending process 300 (not shown) or resulting in act 302 being repeated at a later time. If a matching vendor identifier is detected at 302 (YES), additional criteria may be considered at act 304. At act 304, a product ID (PID) is tested to determine if a peripheral device connected to the computer matches parameters defined for a driverless operation. If the PID does not match 304 (NO), the process determines no device is available at act 318 and process 300 may end (not shown) or act 302 is repeated at a later time.

If PID matches 304 (YES), a determination is made on whether a re-enumeration usage is defined on the peripheral device. According to some embodiments the determination can be made by determining if a specific control endpoint exists on the peripheral device. In some embodiments, usage reports may be retrieved for the particular device. The usage reports describe the available usages for the particular device. In some embodiments, process 300 can determine if a re-enumeration usage is available based on a usage report obtained from a peripheral device. If the usage is not supported 306 (NO) the process determines no device is available at act 318 and process 300 may end (not shown) or act 302 is repeated at a later time. If the usage is supported 306 (YES), a value set on the device indicates whether re-enumeration has occurred at act 308. In one example, the value can be tested to determine whether it is equal to 1 or not equal to 1. A value equal to 1 indicates that re-enumeration has occurred and a value not equal to one indicates that re-enumeration has not occurred. According to other embodiments, other variables and tests can be implemented to determine a state of the peripheral device with respect to re-enumeration. At 308 (NO), process 300 determines that re-enumeration has not occurred, and at act 310 a value is written to the peripheral device using the control endpoint to trigger re-enumeration of the device. In response to the value being written, the peripheral device can be configured to re-describe itself by, for example, altering its descriptor information. At act 312, process 300 waits for the device to be re-enumerated. In one example, with the value now set to 1 the test at act 308 is passed 308 (YES) and process 300 proceeds to act 314. In one alternative, process 300 may identify devices that have undertaken re-enumeration having corresponding values indicating that status and process 300 may proceed directly from 308 (YES) to act 314.

At act 314, process 300 determines whether interrupt traffic is now available to a control application. In some embodiments, the control application may be configured to execute process 300, and in other embodiments the control application can be separate from process 300. The control application can be configured to execute operations on the peripheral device, and once interrupt traffic is available to the control application 314 (YES) the control application is operational at act 316 and process 300 may end, alternatively process 300 can be started again at act 302 to continue monitoring the computer system for attached devices with matching information. The control application can be configured to execute a variety of operations in response to receiving interrupt traffic from the peripheral device.

If interrupt traffic is not available 314 (NO), process 300 determines that no device is available to communication with at act 318 and process 300 may end (not shown), or alternatively process 300 can be restarted at act 302 at a later time.

According to some embodiments, a processor on a computer system can execute a control component to perform driverless operations on connected peripheral devices. The control component can be configured to perform any of the example processes 100, 200, and 300. Further the control component can be configured to perform a variety of operations on the peripheral device. For example, the control component can be configured to determine that a peripheral device supports re-enumeration, and may be configured to do so prior to executing any of processes 100, 200, and/or 300. In other embodiments, the control engine can be configured to identify USB HID compliant devices and verify that an operating system has a USB HID class driver appropriate for a given USB HID device. The control engine can be configured to transition driver control of a peripheral device from a loaded vendor supplied driver to a generic OS native driver. In some setting, the control engine triggers a peripheral device to alter its descriptor records. In one example, the altered descriptor record identifies the peripheral device as a generic USB HID device. From the perspective of the OS the peripheral device with the vendor supplied driver ceases to be connected to the computer system and a new USB HID device under the altered descriptor records is now attached. The altered descriptor records can also identify a particular USB HID class for the peripheral device. Once the OS identifies the change, the OS will break the existing connection through the loaded vendor supplied driver and manage the peripheral device through the native USB HID device driver. In some embodiments, control engines are configured for execution on a number of different operating systems. In some embodiments, a control engine can be implemented as part or form the entirety of a control application installed and executed on a computer system.

Computer System

Various aspects, functions and/or algorithms described herein can be implemented as specialized hardware, software components, or engines executing in one or more computer systems. One or more of any type computer system can be used to execute a control component configured to disable an existing connection between an operating system and a peripheral device established through a device driver, establish communication with the at least one peripheral device using defined communication channels while the existing connection is disabled, defined communication channels can be accessed via native OS functionality without new driver installation, execute at least one operation on the peripheral device over the defined communication channels, and trigger enumeration of a peripheral device to restore an existing connection between an operating system and the peripheral device. Further, the computer systems can be configured to provide for redefinition of a peripheral device's identifying information, restoration of a peripheral device's identifying information to an original state, triggering a hardware discovery operation to detect peripheral devices connected to the computer system, determining that a peripheral device supports re-enumeration and/or meets USB HID standards, performing firmware updates or modifying operation parameters on the peripheral device without requiring new driver installation, transitioning interrupt control of a peripheral device from an installed driver to an OS native communication channel, and transitioning interrupt control of a peripheral device from an installed driver to an USB HID driver without requiring new driver installation.

Additionally, any system may be located on a single computer or may be distributed among a plurality of computers attached by a communications network. There are many examples of computer systems that are currently in use. These examples include, among others, network appliances, personal computers, workstations, mainframes, networked clients, servers, media servers, application servers, database servers and web servers. Other examples of computer systems can include mobile computing devices, such as cellular phones, personal digital assistants, tablet computers and laptop computers, and network equipment, such as load balancers, routers and switches. Further, aspects can be located on a single computer system or can be distributed among a plurality of computer systems connected to one or more communications networks.

For example, various aspects and functions can be distributed among one or more computer systems configured to provide a service to one or more client computers, or to perform an overall task as part of a distributed system. Additionally, aspects can be performed on a client-server or multi-tier system that includes components distributed among one or more server systems that perform various functions. Consequently, examples are not limited to executing on any particular system or group of systems. Further, aspects, functions, and/or algorithms can be implemented in software, hardware or firmware, or any combination thereof. Thus, aspects, processes, algorithms, and functions can be implemented within methods, acts, systems, system elements and components using a variety of hardware and software configurations, and examples are not limited to any particular distributed architecture, network, or communication protocol.

Figure 5:
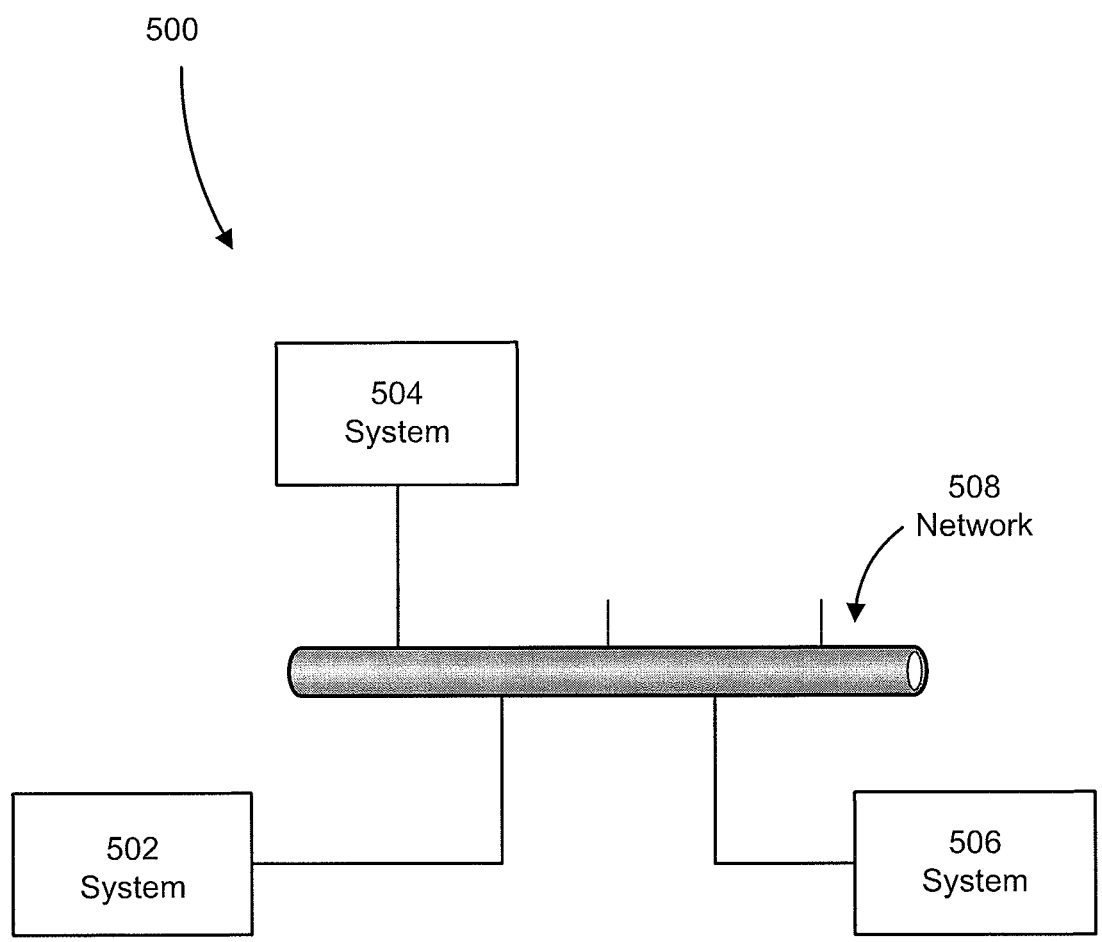
FIG. 5 is a block diagram illustrating a distributed computer system on which aspects of the disclosure can be implemented.

Referring to FIG. 5, there is illustrated a functional schematic of a distributed computer system 500 in which various aspects and functions are practiced, the distributed computer system 500 includes one more computer systems that exchange information. More specifically, the distributed computer system 500 includes computer systems 502, 504 and 506. As shown, the computer systems 502, 504 and 506 are interconnected by, and can exchange data through, a communication network 508. The network 508 can include any communication network through which computer systems can exchange data. To exchange data using the network 508, the computer systems 502, 504 and 506 and the network 508 can use various methods, protocols and standards, including, among others, RS-485, RS422, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 502, 504 and 506 can transmit data via the network 508 using a variety of security measures including, for example, TLS, SSL or VPN. While the distributed computer system 500 illustrates three networked computer systems, the distributed computer system 500 is not so limited and can include any number of computer systems and computing devices, networked using any medium and communication protocol.

Figure 4:
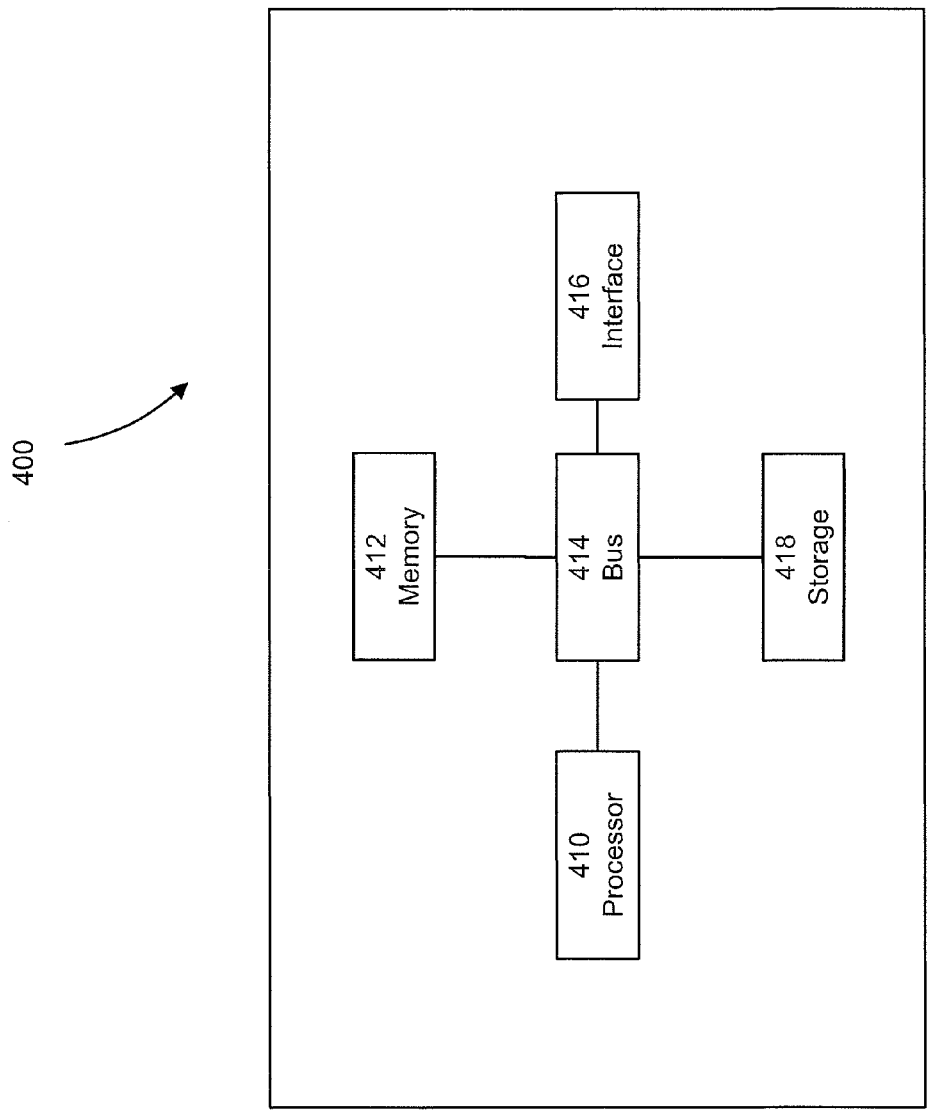
FIG. 4 is a block diagram illustrating a general purpose computer system on which aspects of the disclosure can be implemented.

FIG. 4 illustrates a particular example of a computer system 400 that can operate independently or work in a distributed environment. In some embodiments, computer system 400 can be implemented repeatedly, for example, as the computer systems shown at 502, 504 and 506 in FIG. 5. As illustrated in FIG. 4, the computer system 400 includes a processor 410, a memory 412, a bus 414, an interface 416 and data storage 418. To implement at least some of the aspects, functions and processes disclosed herein, the processor 410 performs a series of instructions that result in manipulated data. The processor 410 can be any type of processor, multi-processor, controller or microcontroller. Some exemplary processors include commercially available processors such as a Stellaris ARM Cortex-M3, Intel Xeon, Itanium, Core, Celeron, Pentium, AMD Opteron, Sun UltraSPARC, IBM Power5+ and IBM mainframe chip. The processor 410 is connected to other system components, including one or more memory devices 412, by the bus 414.

The memory 412 stores programs and data during operation of the computer system 400. Thus, the memory 412 can be a relatively high performance, volatile, random access memory such as a dynamic random access memory (DRAM) or static memory (SRAM). However, the memory 412 can include any device for storing data, such as a disk drive or other non-volatile storage device. Various examples can organize the memory 412 into particularized and, in some cases, unique structures to perform the functions disclosed herein. These data structures can be sized and organized to store values for particular data and types of data.

Components of the computer system 400 are coupled by an interconnection element such as the bus 414. The bus 414 can include one or more physical busses, for example, busses between components that are integrated within a same machine, but can include any communication coupling between system elements including specialized or standard computing bus technologies such as IDE, SCSI, PCI and InfiniBand. Thus, the bus 414 enables communications, such as data and instructions, to be exchanged between system components of the computer system 400.

The computer system 400 also includes one or more devices connected to interface 416 such as input devices, output devices and combination input/output devices. Interface devices can receive input or provide output. More particularly, output devices can render information for external presentation. Input devices can accept information from external sources. Examples of interface devices include keyboards, mouse devices, trackballs, microphones, touch screens, printing devices, display screens, speakers, network interface cards, etc. Interface devices allow the computer system 400 to exchange information and communicate with external entities, such as users and other systems. Interface 416 can be configured a multiple interface connectors which can be used by interface devices to connect to computer system 400. Interface connectors can include serial ports, parallel ports, USB connectors, sata, and other removable storage media interfaces, for example. Peripheral devices can be connected to computer system 400 to extend the base operations of computer system 400. Peripheral devices can be connected to the computer system 400 through the interface connectors. A variety of peripheral devices exist to augment computer system operations and can include the interface devices discussed above, and can also include UPS's, smart UPS, power distribution units (PDUs), for example. Peripheral devices can also be operatively connected to computer system through wireless communication via network 408 or wireless communication can be provided via interface 416 through a peripheral device configured to provide wireless functionality to the computer system 400.

The data storage 418 includes a computer readable and writeable nonvolatile (non-transitory) data storage medium in which instructions are stored that define a program or other object that is executed by the processor 410. The data storage 418 also can include information that is recorded, on or in, the medium, and that is processed by the processor 410 during execution of the program. More specifically, the information can be stored in one or more data structures specifically configured to conserve storage space or increase data exchange performance. The instructions can be persistently stored as encoded signals, and the instructions can cause the processor 410 to perform any of the functions described herein. The medium can, for example, be optical disk, magnetic disk or flash memory, among others. In operation, the processor 410 or some other controller causes data to be read from the nonvolatile recording medium into another memory, such as the memory 412, that allows for faster access to the information by the processor 410 than does the storage medium included in the data storage 418. The memory can be located in the data storage 418 or in the memory 412, however, the processor 410 manipulates the data within the memory, and then copies the data to the storage medium associated with the data storage 418 after processing is completed. A variety of components can manage data movement between the storage medium and other memory elements and examples are not limited to particular data management components. Further, examples are not limited to a particular memory system or data storage system.

Although the computer system 400 is shown by way of example as one type of computer system upon which various aspects and functions can be practiced, aspects and functions are not limited to being implemented on the computer system 400 as shown in FIG. 4. Various aspects and functions can be practiced on one or more computers having a different architectures or components than that shown in FIGS. 4 and 5. For instance, the computer system 400 can include specially programmed, special-purpose hardware, such as an application-specific integrated circuit (ASIC) tailored to perform a particular operation disclosed herein. While in another example, computer system 400 can perform the same function using a grid of several general-purpose computing devices running MAC OS System X with Motorola PowerPC processors and several specialized computing devices running proprietary hardware and operating systems.

The computer system 400 can be a computer system including an operating system that manages at least a portion of the hardware elements included in the computer system 400. In some examples, a processor or controller, such as the processor 410, executes an operating system. Examples of a particular operating system that can be executed include Windows-based operating systems, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems can be used, and examples are not limited to any particular operating system.

The processor 410 and operating system together define a computer platform for which application programs in high-level programming languages are written. These component applications can be executable, intermediate, bytecode or interpreted code which communicates over a communication network, for example, the Internet, using a communication protocol, for example, TCP/IP. Similarly, aspects can be implemented using an object-oriented programming language, such as .Net, SmallTalk, Java, C++, Ada, or C# (C-Sharp). Other object-oriented programming languages can also be used. Alternatively, functional, scripting, or logical programming languages can be used.

Additionally, various aspects and functions can be implemented in a non-programmed environment, for example, documents created in HTML, XML or other format that, when viewed in a window of a browser program, render aspects of a graphical-user interface or perform other functions. Further, various examples can be implemented as programmed or non-programmed elements, or any combination thereof. For example, a web page can be implemented using HTML while a data object called from within the web page can be written in C++ or other programming language. Thus, the examples are not limited to a specific programming language and any suitable programming language could be used. Thus, the functional components disclosed herein can include a wide variety of elements, e.g. specialized hardware, executable code, data structures or objects, that are configured to perform the functions described herein.

Figure 6:
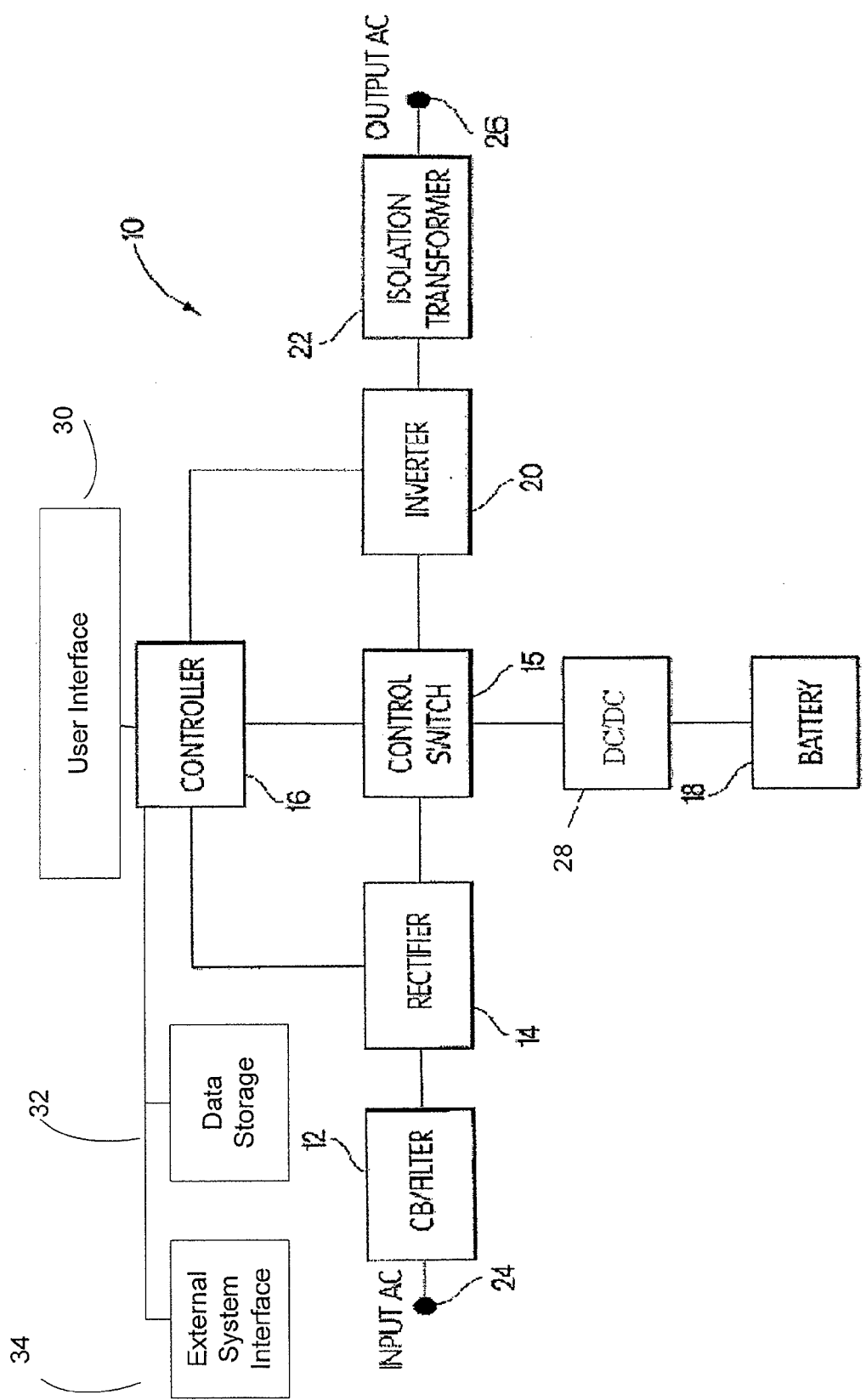
FIG. 6 is a block diagram illustrating an example UPS peripheral device.

As discussed, the computer systems, e.g., 400, can be connected to a variety of peripheral devices and the peripheral device can perform different operations in association with control by the computer system, e.g., 400. In some embodiments, the peripheral devices can include UPS devices and smart UPS devices. FIG. 6. illustrates an example of a UPS device that can be operated on driverlessly according to aspects and embodiments disclosed herein. FIG. 6 shows an example of an on-line UPS 10 used to provide regulated, uninterrupted power when connected to a computer system, e.g., 400. While an on-line UPS is shown, in other embodiments other types of UPS's may be used. In other embodiments the UPS can include different topologies. For example, some topologies can include stand-by or line interactive UPS topologies and other topologies can include double conversions topologies. Example UPS 10 includes an input circuit breaker/filter 12, a rectifier 14, a control switch 15, a controller 16, a battery 18, an inverter 20, an isolation transformer 22, a DC/DC converter 28, a user interface (UI) 30, data storage 32 and external system interface 34. The UPS also includes an input 24 for coupling to an AC power source, and an outlet 26 for coupling to a load.

The UPS 10 operates as follows. The circuit breaker/filter 12 receives input AC power from the AC power source through the input 24, filters the input AC power and provides filtered AC power to the rectifier 14. The rectifier 14 rectifies the input voltage. The DC/DC converter 28 regulates DC power from the battery 18. The control switch 15 receives the rectified power and also receives the DC power from the DC/DC converter 28. The controller 16 determines whether the power available from the rectifier 14 is within predetermined tolerances, and if so, controls the control switch 15 to provide the power from the rectifier 14 to the inverter 20. If the power from the rectifier 14 is not within the predetermined tolerances, which may occur because of "brown out" or "black out" conditions, or due to power surges, then the controller 16 controls the control switch 15 to provide the DC power from the DC/DC Converter 28 to the inverter 20.

In an alternative example, the battery is coupled to the rectifier circuit and the rectifier functions as a boost converter on-line mode of operation and on-battery mode of operation as described in U.S. Pat. No. 7,402,921, entitled "Method and Apparatus For Providing Uninterruptible Power," issued Jul. 22, 2008, which is hereby incorporated herein by reference in its entirety.

The inverter 20 of the UPS 10 receives DC power and converts the DC power to AC power and regulates the AC power to predetermined specifications. The inverter 20 provides the regulated AC power to the isolation transformer 22. The isolation transformer 22 is used to increase or decrease the voltage of the AC power from the inverter 20 and to provide isolation between a load and the UPS 10. The isolation transformer 22 is an optional device, the use of which is dependent on UPS output power specifications. Depending on the capacity of the battery 18 and the power requirements of the load, the UPS 10 can provide power to the load during brief power source dropouts or for extended power outages.

Using data stored in associated memory, the controller 16 performs one or more instructions that may result in manipulated data, and the controller 16 monitors and controls operation of the UPS 10. In some examples, the controller 16 may include one or more processors or other types of controllers. In one example, the controller 16 is a commercially available, general purpose processor. In another example, the controller 16 performs a portion of the functions disclosed herein on a general purpose processor and performs another portion using an application-specific integrated circuit (ASIC) tailored to perform particular operations. As illustrated by these examples, examples in accordance with the present invention may perform the operations described herein using many specific combinations of hardware and software and the invention is not limited to any particular combination of hardware and software components.

The data storage 32 stores computer readable and writable information required for the operation of the UPS 10. This information may include, among other data, data subject to manipulation by the controller 16 and instructions that are executable by the controller 16 to manipulate data. The data storage 32 may be a relatively high performance, volatile, random access memory such as a dynamic random access memory (DRAM) or static memory (SRAM) or may be a nonvolatile storage medium such as magnetic disk or flash memory. In one example, the data storage 32 includes both volatile and non-volatile storage. Various examples in accordance with the present invention can organize the data storage 32 into particularized and, in some cases, unique structures to perform the aspects and functions disclosed herein. In addition, these data structures may be specifically configured to conserve storage space or increase data exchange performance.

In one example, the data storage 32 includes data structures that house one or more operational parameters. As discussed further below, these operational parameters affect the operation of the UPS 10. Some example operational parameters include, among other operational parameters, a language parameter, a display mode parameter, a menu type parameter, and usage specifications. According to some embodiments, UPS 10 can include a USB interface for connecting to a computer system. Further UPS 10 can be architected to meet the logical specifications for a USB HID device. In some embodiments, collections and usages are defined on the UPS in accordance with the USB HID specification. Usage tables can be stored on the device in data storage 32 which describe the available usages for the UPS 10. An example description of the data element used to control the driverless operation:

| 0xID | Name | Description | Type | Access |
|---|---|---|---|---|
| 3A | USBDevice TypeSetting_EN | Controls the top level collection in the USB descriptor. Changing this value resolves need to install a driver on a conventional OS. | ENUM: Size: 2<br>0 UPS<br>1 VendorCustom Device<br>-32767 RANGE<br>2-32767 RANGE | readWrite<br><br>Required for use of native OS operations<br>Requires a specific application to be installed to communicate "Driverless mode"<br>Not defined Reserved for future use<br>Not defined. Reserved for future use |

In some embodiments, a connected computer system can be configured to request the usage triggering redefinition of descriptor information stored in the memory of the UPS. In some examples, the UPS is configured to re-describe itself as a generic USB HID device. In other examples, the UPS can be further configured to identify a class within the USB HID specification, including for example, a description of the UPS as a Power Class device. In some embodiments, re-description occurs through configuration requests.

In some examples, the data storage 32 holds a configuration request. In these examples, a configuration request is an indication that the UPS 10 should direct the user to configure the UPS 10 at some future time. In one example, the UPS 10 is configured to respond to pending configuration requests immediately. In another example, the UPS 10 is configured to respond to pending configuration requests during its next power-up.

Configuration requests may be generated at various times, by various events. For example, a configuration request may be generated during the manufacturing process of the UPS 10, so that the user of the UPS 10 will be directed to configure the UPS 10 as part of its initial installation. In another example, the user may use the factory defaults screen 354 which, as discussed below, allows the user to revert the configuration of the UPS 10 to a default configuration established by the manufacturer. Such a re-initialization may generate a configuration request. In another example, the user may expressly create a configuration request via a user interface. While in some examples, the configuration request is initiated by storing the configuration request in data storage 32, examples of the present invention are not limited thereto. In other examples, the configuration request is created by other actions, such as actuation of a reset button, toggling of a dip switch or reception of the configuration request via the external system interface 34.

The external system interface 34 exchanges data with one or more external devices. These external devices may include any device configured to communicate using standards and protocols supported by the UPS 10. Examples of specific standards and protocols that the external system interface 34 may support include parallel, serial, USB, and USB HID interfaces. Other examples of these supported protocols and standards include networking technologies such as UDP, TCP/IP and Ethernet technologies. In at least some examples, the external system interface includes a network management card (NMC) and a USB interface.

The user interface 30 includes a display screen and a set of keys through which a user of the UPS 10 can monitor, control and configure operation of the UPS 10. FIG. 2 depicts an external view of the UPS 10 including the user interface 30.

As shown, the user interface 30 includes a power button 40, a replace battery indicator 42, a warning indicator 44, an on-battery power indicator 46, an on-line power indicator 48, an interface display 50, a scroll up button 52, a scroll down button 54, an enter button 56 and an escape button 58.

The user interface 30 functions as follows. The power button 40, when actuated, will cause the UPS 10 to toggle between power-on and power-off states. According to some examples, the UPS 10 performs a series of accompanying actions to better manage these power state transitions.

The set of indicators 42, 44, 46 and 48 provide various information regarding current and prior states of the UPS 10. For example, the UPS 10 may determine by running a self-test, that the battery 18 needs to be replaced. In this instance, the UPS 10 illuminates the replace battery indicator 42 to communicate this need.

The on-line power indicator 48 and the on-battery power indicator 46 signal the current source of power to the load. An active on-line power indicator 48 signals that the UPS 10 is providing power to the load in a normal operating fashion, i.e. the source of the power is the AC received through the input 24. Conversely, an active on-battery power indicator 46 signals that the source of the power to the load is the battery 18.

In another example, the UPS 10 may determine, for a variety of reasons, that the attention of the user is needed. The reasons may include, among others, detection that the battery 18 is disconnected or that the battery 18 has been depleted by the load. In this case, the UPS 10 signals the need for user attention by activating the warning indicator 44. In addition, the UPS 10 may provide a description of the reason for the warning in the interface display 50.

The interface display 50, which can be fashioned by a variety of hardware components including Liquid Crystal Displays and Light Emitting Diodes, presents a wide variety of information to a user. This information may include monitoring information, such as the status warnings discussed above. In addition, this information may include configuration information and prompts through which the UPS 10 collects information from the user. Together, the interface display 50 and buttons 52, 54, 56 and 58 provide the UPS 10 with more flexibility in exchanging information with the user than is available using conventional UPS technology.

In one example, UPS 10 includes an interface structure that can be navigated by the user using the interface display 50 and buttons 52, 54, 56 and 58 which can be configured to provide data entry functions. In other examples, online UPS's do not need to include user interface 30 or the associated structures.

Further examples of UPS devices include offline UPS devices connected to computer systems which can be operated driverlessly. In particular, an offline UPS is configured to supply power to a connected computer system in response to a primary power supply failure rather than supply power at all times as in an online UPS. In some examples, offline UPS devices can include an input circuit breaker/filter, a rectifier, a control switch, a controller, a battery, an inverter, an isolation transformer, a DC/DC converter, an optional user interface (UI), data storage and external system interface and also includes an input for coupling to an AC power source, and an outlet for coupling to a load which can operate as discussed above. Further examples, include online and offline UPS's that include USB interfaces, memory and at least one processor for enabling and responding to requests for a particular usage. In some embodiments, the UPS's are configured to be compliant with the USB HID logical specification. In yet other embodiments, the UPS's can be compliant with the specification of USB HID Power Device Class specifications. Any UPS can be configured with a USB connector and connected a computer system, e.g., computer system 400.

In some examples, the components disclosed herein can read parameters that affect the functions performed by the components. These parameters can be physically stored in any form of suitable memory including volatile memory (such as RAM) or nonvolatile memory (such as a magnetic hard drive). In addition, the parameters can be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

The processes disclosed herein each include one particular sequence of acts in a particular example. The acts included in processes may be performed by, or using, one or more computer systems discussed with respect to FIG. 4 and FIG. 5 specially configured as discussed herein. Some acts are optional and, as such, may be omitted in accord with one or more embodiments. Additionally, the order of acts can be altered, or other acts can be added, without departing from the scope of the systems and methods discussed herein. In addition, as discussed above, in at least one embodiment, the acts are performed on a particular, specially configured machine, namely a computer system configured according to the examples disclosed herein.

Having thus described several aspects of at least one embodiment, it is to be appreciated that various alterations, modifications, and improvements will readily occur to those skilled in the art. For example, the above driverless operations and control components may be implemented on PCs and server systems. Such alterations, modifications, and improvements are intended to be part of this disclosure, and are intended to be within the scope of the examples discussed herein. Accordingly, the foregoing description and drawings are by way of example only.

What is claimed is:

1. A system comprising:
    at least one processor operatively connected to a memory, wherein the processor is configured to execute system components from the memory;
    a control component configured to:
        disable an existing connection between an operating system and at least one peripheral device, wherein the existing connection is established through a first device driver;
        establish communication with the at least one peripheral device using defined communication channels while the existing connection is disabled;
        execute at least one operation on the at least one peripheral device over the defined communication channels; and
        trigger enumeration of the at least one peripheral device to restore the existing connection between operating system and the at least one peripheral device.

2. The system according to claim 1, wherein the control component is further configured to redefine the peripheral device's identifying information over the existing connection.

3. The system according to claim 2, wherein the control component is further configured to restore the peripheral device's identifying information to an original state.

4. The system according to claim 1, wherein the at least one peripheral device is operatively connected to the computer system through a USB interface.

5. The system according to claim 4, wherein the control component is further configured to determine that the at least one peripheral device supports re-enumeration.

6. The system according to claim 1, wherein the system is configured to establish communication with the at least one peripheral device using defined communication channels while the existing connection is disabled using a native OS driver.

7. The system according to claim 1, wherein the defined communication channels include control and interrupt endpoints for the at least one peripheral device.

8. The system according to claim 1, wherein the at least one operation includes at least one of updating firmware of the peripheral device, enabling additional functionality on the peripheral device, disabling functionality on the peripheral device, adding features to the peripheral device, and modifying at least one operating parameter of the peripheral device.

9. A computer implemented method for re-enumerating a peripheral device, the method comprising:
    disabling, by a computer system, an existing connection between an operating system executing on the computer system and at least one peripheral device operatively connected to the computer system, wherein the existing connection is established through a first device driver;
    establishing, by the computer system, communication with the at least one peripheral device using defined communication channels while the existing connection is disabled;
    executing, by the computer system, at least one operation on the at least one peripheral device over the defined communication channels; and
    triggering, by the computer system, enumeration of the peripheral device to restore the existing connection between the operation system and the peripheral device established through the first device driver.

10. The method according to claim 9, wherein the act of disabling the existing connection includes an act of redefining the peripheral device's identifying information over the existing connection.

11. The method according to claim 10, wherein the method further comprises an act of restoring the peripheral device's identifying information to an original state.

12. The method according to claim 9, wherein the at least one peripheral device is operatively connected to the computer system through a USB interface.

13. The method according to claim 12, wherein the method further comprises determining that the at least one peripheral device supports re-enumeration.

14. The method according to claim 9, wherein the act of establishing communication includes occurs using a native OS driver.

15. The method according to claim 9, wherein the defined communication channels include control and interrupt endpoints for the at least one peripheral device.

16. The method according to claim 9, wherein the at least one operation includes at least one of updating firmware of the peripheral device, enabling additional functionality on the peripheral device, disabling functionality on the peripheral device, adding features to the peripheral device, and modifying at least one operating parameter of the peripheral device.

17. A non-transitory computer readable medium having stored thereon sequences of instruction for re-enumerating a peripheral device, the sequences of instruction including instructions that will cause at least one processor to:
  disable an existing connection between an operating system executing on the computer system and at least one peripheral device operatively connected to the computer system, wherein the existing connection is established through a first device driver;
  establish communication with the at least one peripheral device using defined communication channels while the existing connection is disabled;
  execute at least one operation on the at least one peripheral device over the defined communication channels; and
  trigger enumeration of the peripheral device to restore the existing connection between the operation system and the peripheral device established through the first device driver.

18. The non-transitory computer readable medium according to claim 17, wherein the sequences of instruction include further instructions that will cause the at least one processor to redefine the peripheral device's identifying information over the existing connection.

19. The non-transitory computer readable medium according to claim 17, wherein the sequences of instruction include instructions that will cause the at least one processor to restore the peripheral device's identifying information to an original state.

20. The non-transitory computer readable medium according to claim 17, wherein the sequences of instruction include further instructions that will cause the at least one processor to establish communication with the at least one peripheral device using defined communication channels while the existing connection is disabled using a native OS driver.

* * * * *

UNITED STATES PATENT AND TRADEMARK OFFICE
CERTIFICATE OF CORRECTION

| | |
|---|---|
| PATENT NO. | : 8,473,666 B2 |
| APPLICATION NO. | : 13/169709 |
| DATED | : June 25, 2013 |
| INVENTOR(S) | : Daniel C. Cohen et al. |

It is certified that error appears in the above-identified patent and that said Letters Patent is hereby corrected as shown below:

In the Specification:

Column 10, Line 16, replace "minor" with --mirror--.

Signed and Sealed this
Twelfth Day of November, 2013

Teresa Stanek Rea
*Deputy Director of the United States Patent and Trademark Office*